United States Patent
Sanchez Rovira et al.

(10) Patent No.: US 12,158,767 B2
(45) Date of Patent: Dec. 3, 2024

(54) ELECTRICAL ASSEMBLY

(71) Applicant: Lear Corporation, Southfield, MI (US)

(72) Inventors: Ramon Sanchez Rovira, Valls (ES); Victor Poblet-Espolet, Valls (ES); Antoni Pujol Simon, Valls (ES); Eduardo De las Heras Palmero, Valls (ES); Oscar Cano Salomo, Tarragona (ES); Ignacio Molinero Horno, Valls (ES); Joan Ignasi Ferran Palau, Valls (ES)

(73) Assignee: Lear Corporation, Southfield, MI (US)

( * ) Notice: Subject to any disclaimer, the term of this patent is extended or adjusted under 35 U.S.C. 154(b) by 451 days.

(21) Appl. No.: 17/554,133

(22) Filed: Dec. 17, 2021

(65) Prior Publication Data
US 2023/0195148 A1 Jun. 22, 2023

(51) Int. Cl.
| | |
|---|---|
| G05F 1/46 | (2006.01) |
| B60L 1/00 | (2006.01) |
| B60R 16/03 | (2006.01) |
| H01C 7/02 | (2006.01) |
| H02H 5/04 | (2006.01) |

(52) U.S. Cl.
CPC ............... *G05F 1/46* (2013.01); *B60L 1/00* (2013.01); *B60R 16/03* (2013.01); *H01C 7/02* (2013.01); *H02H 5/042* (2013.01)

(58) Field of Classification Search
CPC .. B60R 16/03; H02H 5/042; H02H 5/04–048; G05F 1/46
See application file for complete search history.

(56) References Cited

U.S. PATENT DOCUMENTS

| | | |
|---|---|---|
| 5,043,845 A | 8/1991 | McDermott et al. |
| 5,606,483 A | 2/1997 | Sawai et al. |
| 5,805,393 A | 9/1998 | Thomas |
| 5,864,458 A | 1/1999 | Duffy et al. |
| 5,999,384 A | 12/1999 | Chen et al. |
| 6,072,679 A | 6/2000 | Myong |
| 6,078,160 A | 6/2000 | Cilluffo |
| 6,147,850 A | 11/2000 | Gronowicz, Jr. et al. |
| 6,172,303 B1 | 1/2001 | Naegelin et al. |
| 6,201,701 B1 | 3/2001 | Linden et al. |

(Continued)

FOREIGN PATENT DOCUMENTS

| | | | |
|---|---|---|---|
| CN | 208939897 U | * | 6/2019 |
| EP | 1498947 A2 | | 1/2005 |

OTHER PUBLICATIONS

Translation of CN 208939897. (Year: 2019).*

*Primary Examiner* — Jared Fureman
*Assistant Examiner* — Christopher J Clark
(74) *Attorney, Agent, or Firm* — Fishman Stewart PLLC (57) ABSTRACT

An electrical assembly may include an electrical component including a terminal and/or circuit electrically connectable to a controller. The circuit may include a temperature sensor disposed proximate the terminal. The circuit may be configured to initiate a status change of said controller if a temperature of the terminal reaches a predetermined threshold. A method of operating an electrical assembly may include providing power from a power source to an electrical component and/or one or more loads, passively monitoring a current of the electrical component, and/or activating the status change of said controller if the current exceeds a current threshold.

20 Claims, 5 Drawing Sheets

(56) References Cited

U.S. PATENT DOCUMENTS

| | | |
|---|---|---|
| 6,657,839 B2 | 12/2003 | de Oliveira |
| 6,989,976 B2 | 1/2006 | Ashiya |
| 7,113,381 B2 | 9/2006 | Francis |
| 7,180,719 B2 | 2/2007 | Whitney |
| 8,183,504 B2 | 5/2012 | Montoya et al. |
| 9,318,406 B2 | 4/2016 | Prautzsch |
| 9,967,966 B2 | 5/2018 | Schaefer |
| 10,439,196 B2 | 10/2019 | Bourns et al. |
| 2003/0169007 A1* | 9/2003 | Ashiya .................... H02P 29/02 318/471 |
| 2015/0303679 A1* | 10/2015 | Li ......................... H02H 5/042 361/106 |
| 2023/0194627 A1* | 6/2023 | Molinero Horno .... G01R 31/52 200/5 R |

* cited by examiner

ELECTRICAL ASSEMBLY

TECHNICAL FIELD

The present disclosure generally relates to electrical assemblies, including assemblies that may detect and/or protect against certain fault conditions that may, for example, occur in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies do not provide sufficient functionality, are not configured to detect and/or protect against certain fault conditions, and/or require complicated assembly processes.

There is a desire for solutions/options that minimize or eliminate one or more challenges or shortcomings of electrical assemblies. The foregoing discussion is intended only to illustrate examples of the present field and is not a disavowal of scope.

SUMMARY

In embodiments, an electrical assembly may include an electrical component including a terminal and/or circuit electrically connectable to a controller. The circuit may include a temperature sensor disposed proximate the terminal. The circuit may be configured to initiate a status change of said controller if a temperature of the terminal reaches a predetermined threshold, which may include exceeding the predetermined threshold.

With embodiments, a method of operating an electrical assembly may include providing power from a power source to an electrical component and/or one or more loads, passively monitoring a current of the electrical component, and/or initiating the status change of said controller if the current exceeds a current threshold.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
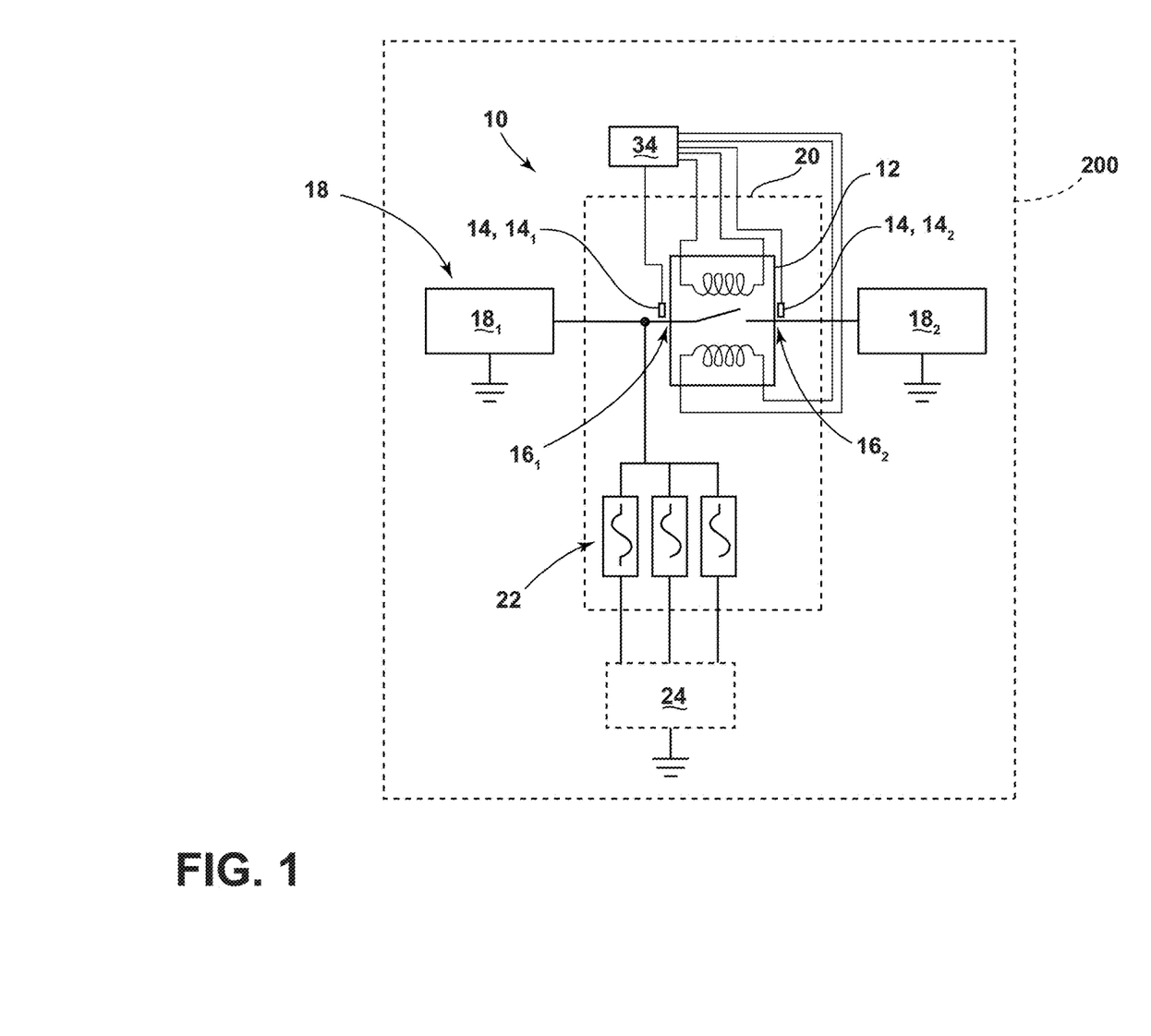
FIG. 1 is a schematic view generally illustrating an embodiment of an electrical assembly.

In embodiments, such as generally illustrated in FIG. 1, an electrical assembly 10 may include an electrical component 12 and/or a circuit 14. The electrical component 12 may include a first terminal $16_1$ and/or a second terminal $16_2$. The first terminal $16_1$ may be electrically connected to a first power source $18_1$ and/or the second terminal $16_2$ may be electrically connected to a second power source $18_2$. In some instances, the first power source $18_1$ may be configured to operate as a primary power source and/or the second power source $18_2$ may be configured to operate as a secondary power source (e.g., backup, supplemental, as needed, etc.). A power source $18_1$, $18_2$ may include one or more of a variety of configurations. For example and without limitation, a power source $18_1$, $18_2$ may include a battery, a capacitor, a solar panel, a power converter, and/or an outlet, among others. In some configurations, a power source $18_1$, $18_2$ may be configured to provide about 10 V to about 15 V (e.g., about 12 V).

In embodiments, an electrical assembly 10 may be disposed at least partially within and/or include an electrical unit 20 (e.g., a circuit breaker unit, a power distribution unit, among others). The electrical assembly 10 may include a plurality of fuses 22 electrically connected to an electrical component 12, a first power source $18_1$, and/or a second power source $18_2$. In some example configurations, an electrical assembly 10, a first power source $18_1$, a second power source $18_2$, and/or an electrical unit 20 may be incorporated with and/or disposed in a vehicle 200, but are not limited to vehicle applications.

In embodiments, a vehicle 200 may include one or more of a variety of configurations. For example and without limitation, a vehicle 200 may include a land vehicle, a passenger car, a van, a sport utility vehicle (SUV), a crossover, a truck (e.g., a pickup truck, a commercial truck, etc.), a bus, a watercraft, an aircraft (e.g., a plane, a helicopter, etc.), and/or a combination thereof (e.g., a vehicle for land and water, a vehicle for air and water, etc.), among others.

In embodiments, a first power source $18_1$ and/or a second power source $18_2$ may be configured to supply power to one or more electrical loads 24. An electrical load 24 may, for example and without limitation, include a single load or a plurality of loads, such as one or more vehicle systems or components (e.g., air conditioner, heater, electric motor, air bag systems, sensors, systems utilizing redundant power supplies, etc.). In some examples of vehicle applications, the one or more electrical loads 24 may include electric motors configured to move a vehicle 200.

In embodiments, an electrical component 12 may include one or more of a variety of configurations. For example and without limitation, an electrical component may include a relay, an electrical switch, a bi-stable relay, and/or a silicon switch, among others and is not limited to a switch. In some example configurations, the electrical component 12 may be configured to permit a first power source $18_1$, a second power source $18_2$, and/or one or more additional batteries to supply power to one or more electrical loads 24. For example, the electrical component 12 may include a first state (e.g., a closed state) that permits the first power source $18_1$, the second power source $18_2$, and/or the one or more additional batteries to supply power to the one or more loads 24. The electrical component 12 may include an additional state (e.g., an open state) that restricts and/or prevents one or more of the first power source $18_1$, the second power source $18_2$, and/or the one or more additional batteries from supplying power to the one or more loads 24. For example, in the second state, the electrical component 12 may restrict and/or prevent current flow from the second power source $18_2$ to the one or more loads 24.

In some instances, a first power source $18_1$, a second power source $18_2$, and/or one or more loads 24 may generate a large electrical current flow through an electrical component 12. Electrical currents flowing through the electrical component 12 may generate or result in a large amount of heat. For example and without limitation, an electrical assembly 10 and/or an electrical component 12 may be configured for use with currents of at least 500 Amps (e.g., for several minutes or more), at least 1000 Amps, and/or at least 2500 Amps (e.g., for at least 10-15 seconds).

Figure 2:
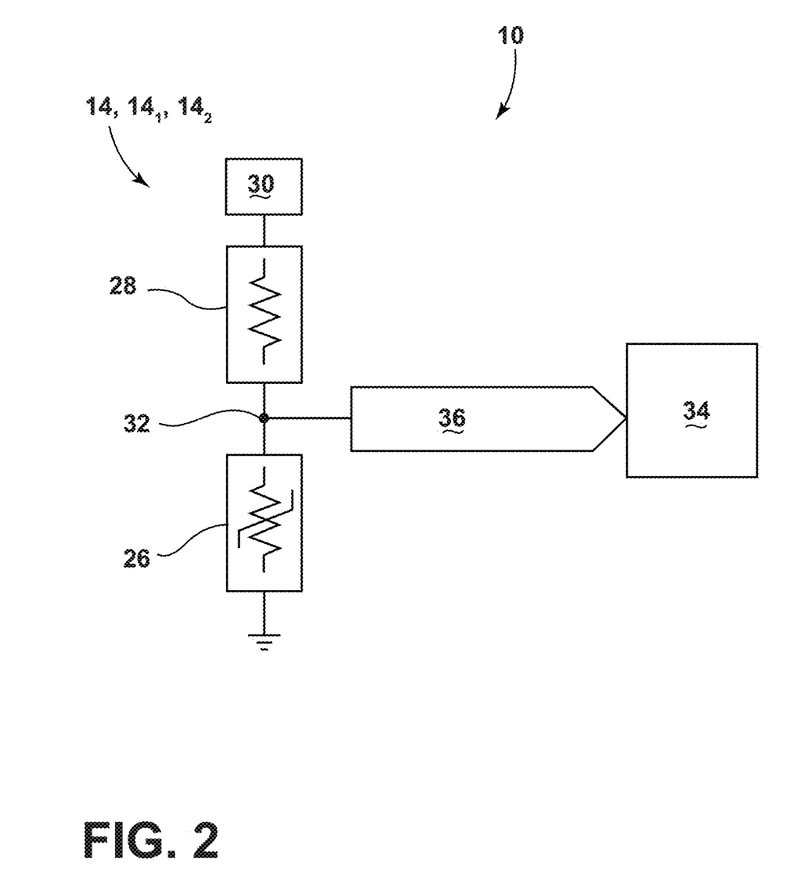
FIG. 2 is a schematic view generally illustrating an embodiment of an electrical assembly.

With embodiments, such as generally illustrated in FIG. 2, a circuit 14 may include a temperature sensor 26. The temperature sensor 26 may include, be configured as, and/or be referred to herein as a resistor 26, but is not limited to a resistor. The circuit may include a resistor 26 and/or an additional resistor 28. The circuit 14 may include and/or be connected to a third power source 30. One or more portions of the circuit 14 may be disposed proximate to and/or may be thermally coupled with a first terminal $16_1$ and/or a second terminal $16_2$ of an electrical component 12. The circuit 14 may not be electrically connected with the electrical component 12. For example and without limitation, the circuit 14 may not be included in a current path with the first power source $18_1$, the second power source $18_2$, the electrical component 12, the fuses 22, or the one or more loads 24 (e.g., may not include or act as a shunt). A third power source 30 may include one or more of a variety of configurations. For example and without limitation, a power source 30 may include a battery, a capacitor, a solar panel, a power converter, and/or an outlet, among others, and may or may not be connected to and/or incorporated with one or both of the first power source $18_1$ and the second power source $18_2$.

In some embodiments, such as generally illustrated in FIG. 1, an electrical assembly 10 may include a first circuit 141 and/or a second circuit 142. The first circuit 141 and the second circuit 142 may be substantially similar or the same (e.g., similar components and/or configuration). The circuits 141, 142 may or may not be electrically connected to each other. One or more portions of the first circuit 141 may be disposed proximate the first terminal $16_1$, and/or one or more portions of the second circuit 142 may be disposed proximate the second terminal $16_2$. For example and without limitation, a resistor 26 may be disposed sufficiently close to a terminal $16_1$, $16_2$ that heat from the terminal $16_1$, $16_2$ is transferred to the resistor 26. In some configurations, the resistor 26 may be at least partially directly between a terminal $16_1$, $16_2$ and the circuit board 42 (see, e.g., FIG. 4). A gap between the terminal $16_1$, $16_2$ and the resistor 26 may, for example and without limitation, be about 5 mm or less (e.g., in a direction perpendicular to the circuit board 42). The gap may be partially or entirely filled with a thermal conductor 44 (e.g., thermal pad, thermal filler, and/or thermal paste, among others).

With embodiments, such as generally illustrated in FIG. 2, a resistor 26 may be connected in series with an additional resistor 28 and an electrical ground. The additional resistor 28 may be connected in series with a third power source 30. The third power source 30 may, in some instances, be electrically connected to one or more of a first power source $18_1$, a second power source $18_2$, and/or an additional power source. The third power source 30 may, for example and without limitation, provide a voltage of about 3.3 V, among other voltages.

With embodiments, a resistor 26 may include a thermistor, such as a positive temperature coefficient (PTC) thermistor, and/or a negative temperature coefficient (NTC) thermistor. In example configurations including a PTC thermistor and the resistor 26 disposed proximate a first terminal $16_1$ of an electrical component 12 (e.g., such that a temperature of the resistor 26 changes in substantially the same manner as the first terminal $16_1$), a resistance of the resistor 26 may increase when a temperature of the first terminal $16_1$ increases, which may occur when an amount of current flowing through the first terminal $16_1$ increases (e.g., the circuit 14 may be configured to use temperature as a proxy for current). For example, when a large current is flowing through the first terminal $16_1$, the temperature of the first terminal $16_1$ may be relatively high, which may cause the resistance of the resistor 26 to be relatively high. In contrast, when a smaller current is flowing through the first terminal $16_1$, the temperature of the first terminal $16_1$ may be lower, which may cause the resistance of the resistor 26 to be relatively low.

With embodiments, a resistor 26 may include an initial resistance that may be relatively low compared to a resistance of the additional resistor 28. For example and without limitation, the initial resistance of the resistor 26 may be at least 10 time less than the resistance of the additional resistor 28. In one example configuration, the resistor 26 may include a resistance of approximately 470 ohms and the additional resistor 28 may include a resistance of approximately 240 kilohms, but the resistors 26, 28 may include other resistance values. With some configurations, the resistance of the resistor 26 may be configured to increase significantly with temperature increases. For example and without limitation, the resistance of the resistor 26 may increase to greater than the resistance of the additional resistor 28, such as when the temperature proximate a terminal $16_1$, $16_2$ increases to about 100° C., and may be significantly greater (e.g., about three times greater) at a maximum temperature (e.g., about 124° C.). A high resistance of the additional resistor 28 may limit current consumption when the circuit 14 is not waking up the controller 34.

With embodiments, a circuit 14 (e.g., resistor 26, additional resistor 28, and/or third power source 30) may be configured to operate as a voltage divider. An output 32 of the voltage divider may be electrically connected to a controller 34. The circuit 14 (e.g., the voltage divider) may be configured to provide an output voltage 36 to the controller 34. The output voltage 36 may increase as a temperature of a terminal 16 of an electrical component 12 (e.g., first terminal $16_1$ and/or second terminal $16_2$) increases and/or as a resistance of a resistor 26 increases.

With some embodiments, a controller 34 may include a system basis chip (SBC). The controller 34 may be electrically connected to one or more additional controllers. In some example configurations, the controller 34 may be electrically connected to an electrical component 12. The controller 34 may be configured to control the electrical component 12. For instance, the controller 34 may be configured to transmit a signal to the electrical component 12 to cause the electrical component 12 to change/switch from a closed state to an open state, and/or from an open state to a closed state.

With embodiments, a controller 34 may be configured to operate in a plurality of modes, such as a first mode and/or a second mode. The first mode may be associated with a low power consumption mode (e.g., a standby mode) and/or the second mode may be associated with an active mode. The lower power consumption mode may, for example and without limitation, involve expected currents of about 20 A or less, about 10 A or less, or other currents. An active mode may, for example and without limitation, involve expected currents of about 100 A or more. With vehicle applications, the plurality of modes of the controller 34 may be associated with modes of a vehicle 200. For example, if the controller 34 is in a first mode, a vehicle 200 may also be in a first mode, and/or if the controller 34 switches from a first mode to a second mode, the vehicle 200 may also switch from a first mode to a second mode.

Figure 3:
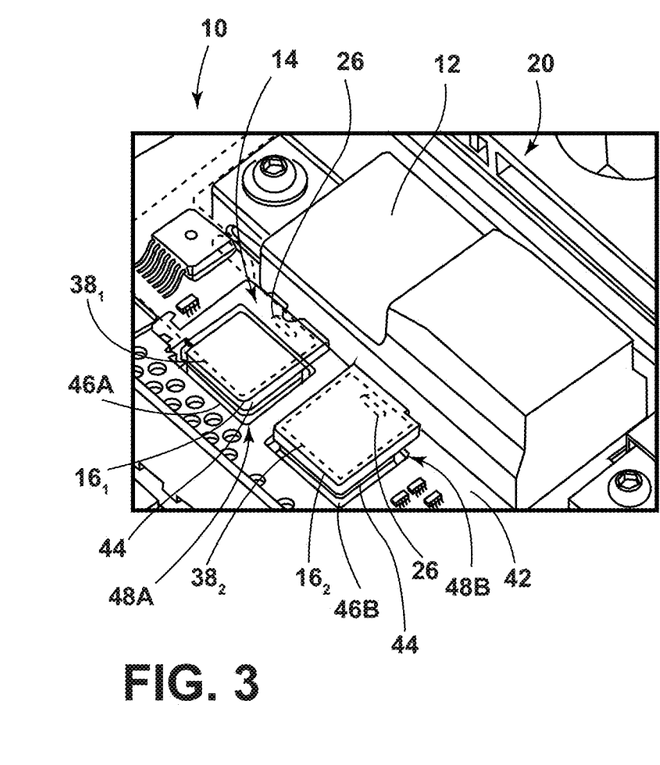
FIG. 3 is a perspective view generally illustrating portions of an embodiment of an electrical assembly.
Figure 4:
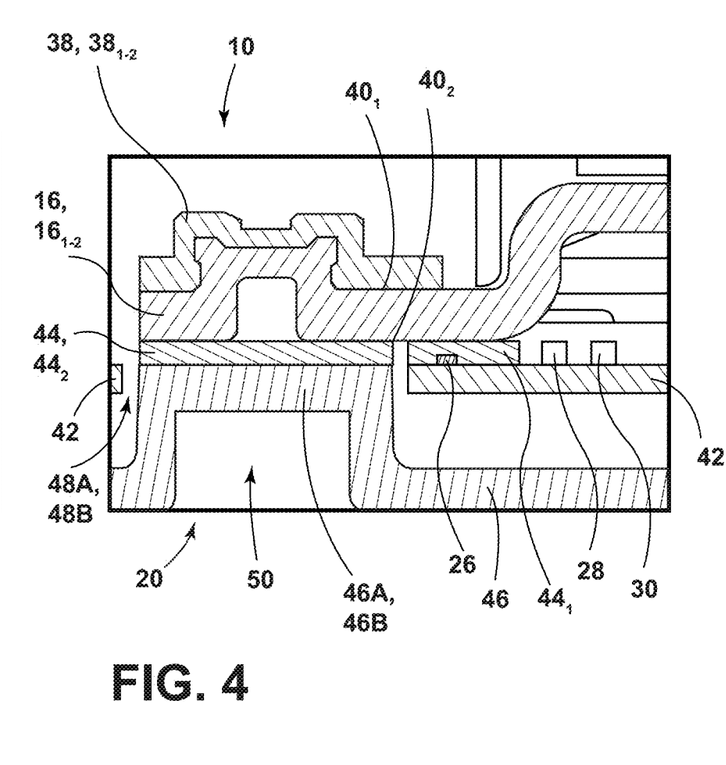
FIG. 4 is a cross-sectional view generally illustrating portions of an embodiment of an electrical assembly.

In embodiments, such as generally illustrated in FIGS. 3 and 4, an electrical assembly 10 may include one or more bus bars 38, such as a first bus bar 381 and/or a second bus bar 382. The first bus bar 381 may be electrically connected to a first terminal $16_1$ of an electrical component 12, to a first power source $18_1$, and/or to one or more loads 24 (e.g., via one or more fuses 22). The second bus bar 382 may be electrically connected to a second terminal $16_2$ of the electrical component 12 and/or to a second power source $18_2$.

In embodiments, a first side 401 of a first terminal $16_1$ of an electrical component 12 may be fixed directly to and/or in contact with a first bus bar 381, and/or a first side 401 of a second terminal $16_2$ of the electrical component 12 may be fixed directly to and/or in contact with a second bus bar 382. The bus bars 38 (e.g., first bus bar 381 and/or second bus bar 382) may be secured to the terminals 16 (e.g., first terminal $16_1$ and/or second terminal $16_2$) via one or more fasteners or fastening methods, such as a crimping connection. A crimping connection may, in some example configurations, include TOX® crimping, among others.

In embodiments, an electrical component 12 and/or a circuit 14 (e.g., resistor 26, additional resistor 28, and/or third power source 30) may be connected to a circuit board 42. The circuit board 42 may include a printed circuit board (PCB). In some example configurations, a thermal conductor 44 may be in direct contact with a second side 402 of a first terminal $16_1$ and/or a second terminal $16_2$ of an electrical component 12. The thermal conductor 44 may include, be configured as, and/or be referred to as a thermal conductor 44. In some example configurations, the thermal conductor 44 may include a singular construct (e.g., unitary body) with one or more portions. For example, the thermal conductor 44 may include a first portion $44_1$ and a second portion 442 that are connected to each other. In some other example configurations, the thermal conductor 44 may include a plurality of separate portions. For example, the first portion $44_1$ and a second portion 442 may be separate/discrete from each other.

In embodiments, a thermal conductor 44 may be in direct contact with a circuit board 42. For example, a first portion $44_1$ of the thermal conductor 44 may be in direct contact with the circuit board 42. The thermal conductor 44 may be disposed between a terminal $16_1$, $16_2$ and the circuit board 42. The thermal conductor 44 may facilitate a thermal transfer between a first terminal $16_1$ and/or a second terminal $16_2$ of an electrical component 12 and the resistor 26. The thermal conductor 44 may comprise a thermally conductive material. For example, a thermal conductor 44 may comprise one or more of a potting material, a thermal pad, a thermal gap pad (e.g., a rubber-like film), a thermal gap filler (e.g., a thermal foam or similar), and a thermal paste (e.g., a gel-like and/or a non-solid material, among others).

In embodiments, an electrical assembly 10 may be disposed at least partially within a housing 46. The housing 46 may be at least partially thermally conductive and/or electrically conductive. For example, the housing 46 may comprise a metal material (e.g., aluminum, etc.).

In some example configurations, such as generally illustrated in FIG. 4, a circuit board 42 may include a void 48A and/or a portion 46A of a housing 46 may be disposed within the void 48A. The portion 46A of the housing 46 may be in direct contact with a thermal conductor 44 (e.g., second portion 442). The portion 46A of the housing 46 may define a rectangular column having a void 50. The rectangular column may help, at least in part, cool a terminal 16 (e.g., first terminal $16_1$) of an electrical component 12. For example and without limitation, the portion 46A may be thermally coupled with the first terminal $16_1$ via the thermal conductor 44.

With embodiments, such as generally illustrated in FIG. 3, a circuit board 42 may include a second void 48B, and a second portion 46B of the housing 46 may be disposed in the second void 48B. The second portion 46B may be configured in the same or a similar manner as the portion 46A, and/or the second portion 46B may be configured to facilitate cooling of a terminal (e.g., second terminal $16_2$). For example and without limitation, the second portion 46B may be thermally coupled with the second terminal $16_2$ via the thermal conductor 44.

In operation, for example and without limitation, an electrical assembly 10 may be configured to detect and/or protect against certain fault conditions. The fault conditions may include, for example, an occurrence of an overcurrent, overtemperature, and/or short-circuit, among others. The fault conditions may cause damage (e.g., thermal event) to one or more electrical loads 24 within a vehicle, if the fault conditions are not detected and/or quickly protected against.

In some examples, an electrical assembly 10 may be configured to passively detect fault conditions, such as while a controller 34 and/or a vehicle 200 is in a first mode (e.g., low power consumption/standby mode). For example and without limitation, the electrical assembly 10 may be configured to detect a fault condition (or another condition for changing the mode of the controller 34) without utilizing the controller 34, such as without a polling process and/or without utilizing a processor of the controller 34 to determine if such a condition exists. In some instances, the vehicle 200 may be parked and/or an electrical component 12 may be in a closed configuration or an open configuration, when the controller 34 is in the first mode.

Figure 5:
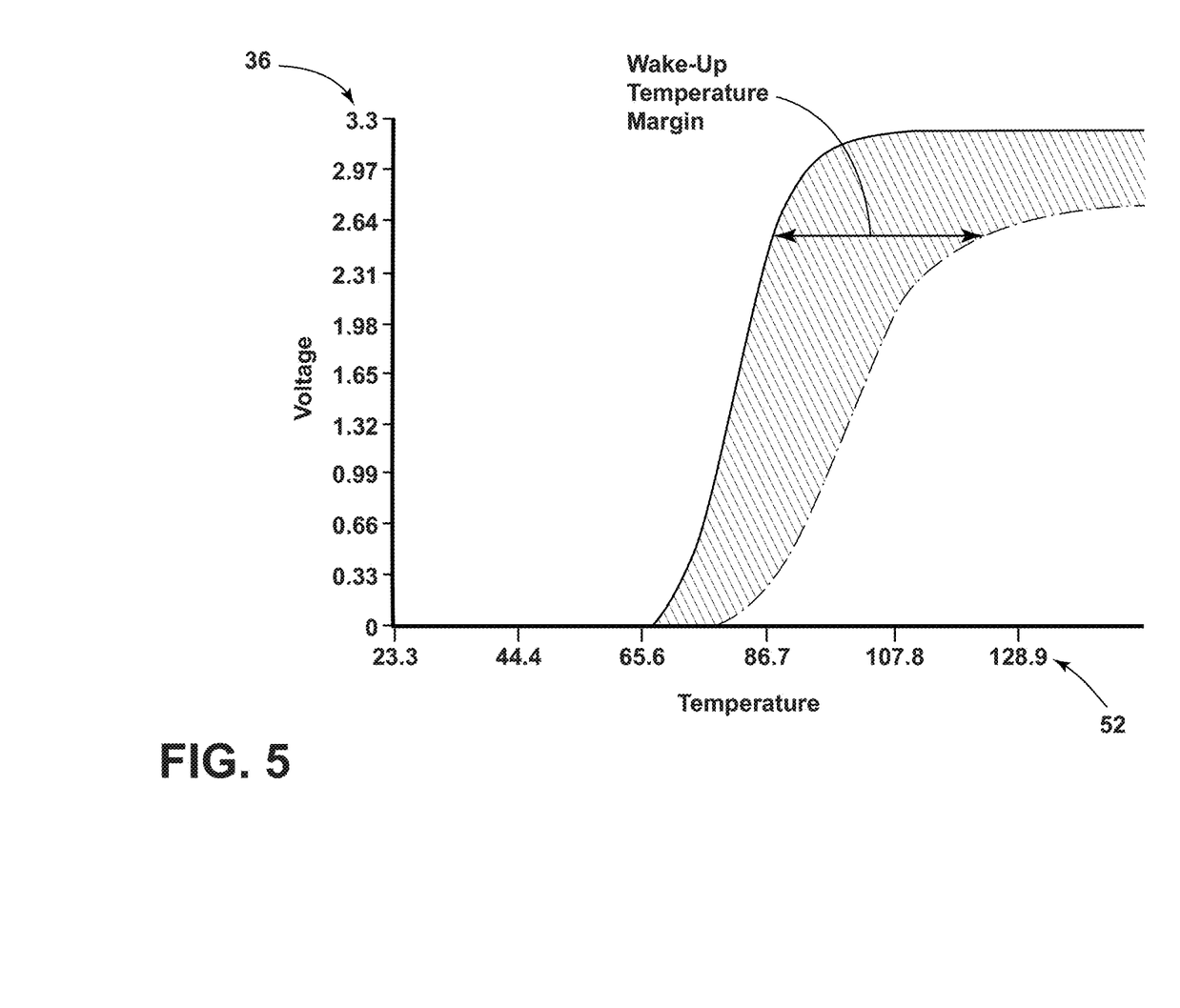
FIG. 5 is a graph generally illustrating voltage relative to temperature for an embodiment of an electrical assembly.

With embodiments, such as generally illustrated in FIG. 5, an occurrence of a fault condition (e.g., overcurrent) may cause a temperature 52 of a terminal 16 (e.g., first terminal $16_1$ and/or second terminal $16_2$) of an electrical component 12 to increase. An increase in the temperature 52 may cause a resistance of a resistor 26 to increase. In some example configurations, a circuit 14 (e.g., voltage divider) may provide an output voltage 36 to a controller 34. When the resistance of the resistor 26 reaches a predetermined threshold, the output voltage 36 may be large enough to initiate a status change of the controller 34 (e.g., is equal to or greater than an activation voltage of the controller 34). In some instances, the initiation voltage of the controller may equal to or greater than approximately 2.5 V. The resistor 26 may be configured such that the output voltage 36 is at least the initiation voltage when the temperature of the terminal 16$_1$ and/or the resistor 26 reaches a maximum permitted temperature or temperature range (which may include exceeding the maximum temperature or range). For example and without limitation, if the controller 34 includes an initiation voltage of about 2.5 V, the resistor 26 may be configured such that the output voltage 36 is about 2.5 V when the temperature 52 in a range of approximately 87° C. to 125° C., which may correspond to an overcurrent condition. For example, if the controller 34 is in a first mode and the current exceeds an expected current, which may be about 20 A or less (or other values), the output voltage 36 of the circuit may increase to about 2.5 V. In other examples, the initiation voltage may be different than about 2.5 V, and/or the maximum temperature range may be different than approximately 87° C. to 125° C.

With embodiments, a status change may cause a controller 34 to change from a first mode (e.g., low power consumption/standby mode) to a second mode (e.g., active mode). In some examples, when the controller 34 is switched into the second mode, the controller 34 may control the electrical component 12 into an open configuration, such that electrical current from the second power source 18$_2$ to the one or more loads 24 is restricted and/or prevented, which may prevent and/or limit damage (e.g., thermal event) to the one or more electrical loads 24.

Embodiments of electrical assemblies 10 may be more efficient and/or effective (e.g., cost, space, power, etc.) than other electrical assemblies that may include components that are large/bulky and expensive, such as Hall effect current sensors and/or shunt resistors. For example, such other electrical assemblies may (i) require a standby polling strategy of activating a controller to measure current, which increases power consumption, (ii) affect the power path (e.g., for a shunt resistor), and (iii) negatively impact spacing/occupy more space due to the bulky components (e.g., Hall effect sensors). With some embodiments of electrical assemblies 10, processor usage may be minimized for waking up the controller 34. For example and without limitation, the circuit 14 may not include a separate controller or processor and may directly change a status of the controller 34 without polling (e.g., may be a hardware-only circuit).

Figure 6:
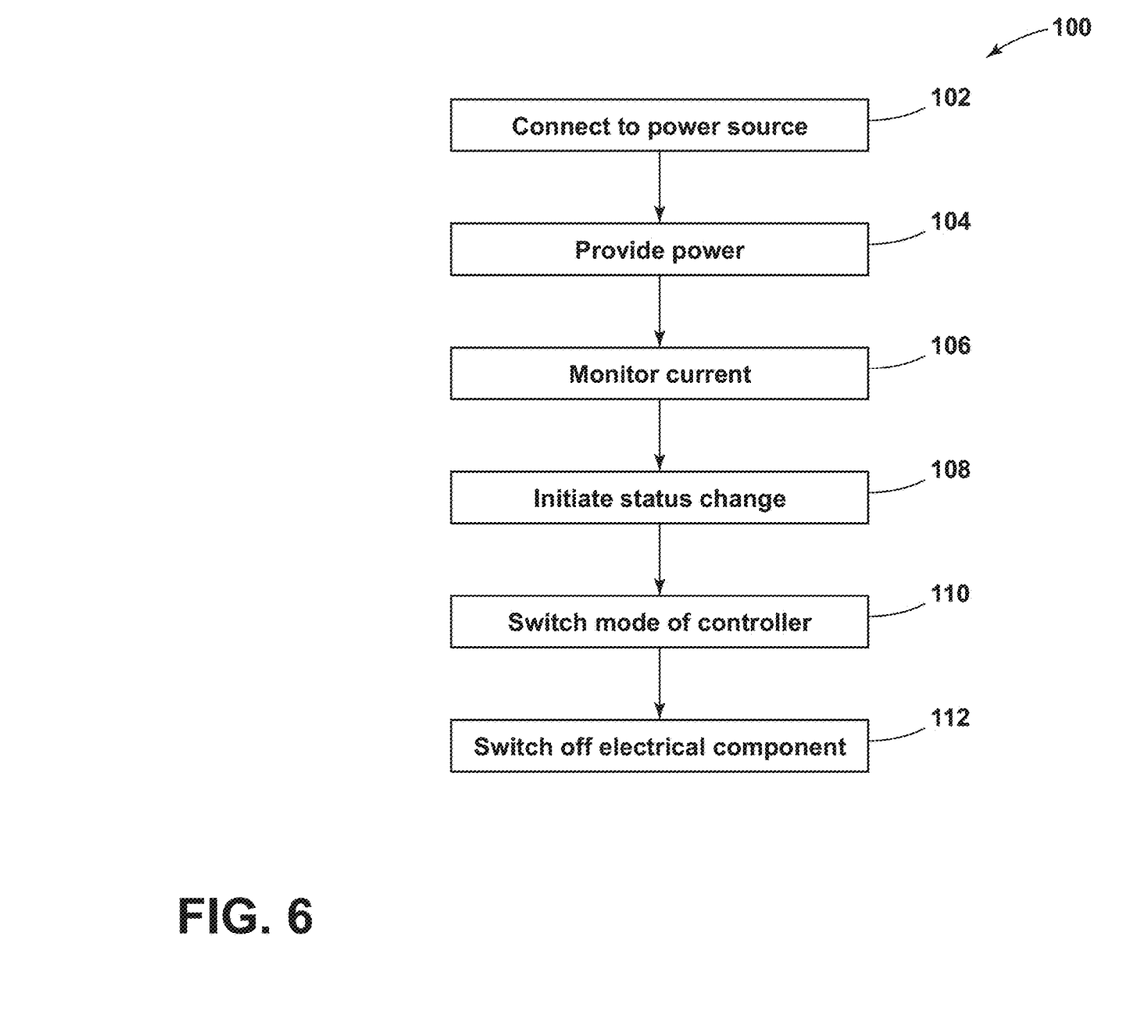
FIG. 6 is a flow diagram generally illustrating an embodiment of a method of operating an electrical assembly.

In embodiments, such as generally illustrated in FIG. 6, a method 100 of operating an electrical assembly 10 may include electrically connecting an electrical component 12 with one or more power sources 18 (block 102). In some configurations, the power source 18 may include a first power source 18$_1$, a second power source 18$_2$, and/or one or more additional power sources. Connecting an electrical component 12 with a power source 18 may include electrically connecting a first terminal 16$_1$ with a first power source 18$_1$ at least in part via a first bus bar 38$_1$, and/or connecting a second terminal 16$_2$ of the electrical component 12 with a second power source 18$_2$ at in part via a second bus bar 38$_2$.

In embodiments, the method 100 may include providing power from a power source 18 to one or more loads 24 (block 104), such as, at least in part, via an electrical component 12. For example, electrical current may flow from the power source 18 through the electrical component 12 to one or more electrical loads 24. Providing power from a power source 18 may cause a temperature of a first terminal 16$_1$ and/or a second terminal 16$_2$ of the electrical component 12 to increase. For example, as the amount of electrical current flowing through the first terminal 16$_1$ and/or the second terminal 16$_2$ increases, a temperature of the first terminal 16$_1$ and/or the second terminal 16$_2$ may also increase.

In embodiments, the method 100 may include passively monitoring an electrical current of the electrical component 12 (block 106), such as of the first terminal 16$_1$ and/or the second terminal 16$_2$ (block 106). Passively monitoring an electrical current may include monitoring one or more temperatures of the electrical component 12, such as via a resistor 26 disposed proximate the first terminal 16$_1$ and/or the second terminal 16$_2$. A resistance of the resistor 26 may be configured to increase when a temperature of the first terminal 16$_1$ and/or the second terminal 16$_2$ increases. The resistor 26 may be electrically connected to an additional resistor 28, and/or a third power source 30. The resistor 26, the additional resistor 28, and/or the third power source 30 may operate as a voltage divider. An output of the voltage divider may be electrically connected to a controller 34.

In embodiments, the method 100 may include initiating a status change of a controller 34 if an electrical current of the electrical component 12, such as a current flowing through a first terminal 16$_1$ and/or a second terminal 16$_2$, exceeds a current threshold (block 108). The resistance of the resistor 26 may be configured to increase such that when the temperature of the terminal(s) 16$_1$, 16$_2$ increases to a level that corresponds to the current threshold, the output of the circuit 14 is approximately an initiation/status change voltage of the controller 34. Initiating the status change of the controller 34 may include the circuit 14 (e.g., voltage divider) providing an output voltage 36 at least as great as the initiation voltage to the controller 34.

In embodiments, the method 100 may include switching a controller 34 from a first mode to a second mode (block 110). For example, initiating a status change of the controller 34 may cause the controller 34 to switch from a first mode (e.g., low power consumption/standby mode) to a second mode (e.g., active mode).

In embodiments, the method 100 may include switching an electrical component 12 to an open configuration (block 112). For example, when a controller 34 is switched to the second mode, the controller 34 may transmit a signal to the electrical component 12 which may subsequently facilitate the electrical component 12 to switch/change from a first state to a second state. For example, the second state may be an open state in which current from the second power source 18$_2$ is restricted and/or prevented from flowing to one or more electrical loads 24, which may limit and/or prevent damage (e.g., thermal event) to the one or more electrical loads 24.

In examples, a controller (e.g., controller 34) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." and "such as" in the specification are to be construed broadly and are used to provide non-limiting examples of embodiments of the disclosure, and the disclosure is not limited to such examples or such types of examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical assembly, comprising:
   an electrical component including a terminal; and
   a circuit electrically connected to a controller, the circuit including:
      a temperature sensor disposed proximate the terminal and thermally connected to the terminal;
   wherein the electrical component and the temperature sensor are connected to a circuit board; the temperature sensor is not electrically connected to the electrical component; the circuit is configured to initiate a status change of said controller if a temperature of the terminal reaches a predetermined threshold; at least a portion of the electrical assembly is disposed in a conductive housing; and a portion of a thermal conductor is in contact with the terminal and the conductive housing.

2. The electrical assembly of claim 1, wherein the status change is configured to change said controller from a first mode to a second mode;
   the second mode is associated with expected currents of at least 100 A; and the first mode is associated with expected currents of less than about 20 A.

3. The electrical assembly of claim 1, wherein the temperature sensor includes a positive temperature coefficient (PTC) thermistor.

4. The electrical assembly of claim 1, wherein the temperature sensor includes a resistor;
the circuit includes an additional resistor and a third power source;
the resistor of the temperature sensor is connected in series with the additional resistor and a ground; and
the additional resistor is connected in series with the third power source.

5. The electrical assembly of claim 4, wherein the circuit is configured to operate as a voltage divider, and an output of the voltage divider is electrically connected to said controller.

6. The electrical assembly of claim 5, wherein the voltage divider is configured to provide an output voltage to said controller.

7. The electrical assembly of claim 6, wherein the circuit is configured such that the output voltage increases as the temperature of the terminal increases.

8. The electrical assembly of claim 1, including a bus bar fixed directly to and in contact with a first side of the terminal; wherein the bus bar is secured to the terminal via a crimping connection.

9. The electrical assembly of claim 1,
wherein the thermal conductor is disposed at least partially between the terminal and the circuit board; and
the thermal conductor is in direct contact with the temperature sensor such that the thermal conductor facilitates a thermal transfer between the terminal and the temperature sensor.

10. The electrical assembly of claim 9, wherein the thermal conductor comprises at least one of a potting material, a thermal pad, a thermal foam, and a thermal paste.

11. The electrical assembly of claim 1, wherein the circuit board includes a void; and
a portion of the conductive housing extends into the void.

12. A method of operating the electrical assembly of claim 1, the method comprising:
providing power from a power source to the electrical component and/or one or more loads;
passively monitoring a current at the electrical component; and
initiating the status change of said controller if the current exceeds a current threshold;
wherein initiating the status change of said controller includes the temperature of the terminal increasing such that a resistance of the temperature sensor increases and the circuit provides a status change voltage to said controller.

13. The method of claim 12, wherein initiating the status change of said controller includes switching said controller from a first mode to a second mode.

14. The method of claim 12, wherein passively monitoring the current of the terminal includes conducting heat from the terminal to the temperature sensor.

15. An electrical assembly, comprising:
an electrical component including a terminal; and
a circuit electrically connected to a controller, the circuit including:
a temperature sensor disposed proximate the terminal;
wherein the circuit is configured to initiate a status change of said controller if a temperature of the terminal reaches a predetermined threshold; the temperature sensor is thermally connected to the terminal; the electrical component and the temperature sensor are connected to a circuit board, and the temperature sensor is not electrically connected to the electrical component;
a thermal conductor is disposed at least partially between the terminal and the circuit board, and the thermal conductor is in direct contact with the temperature sensor such that the thermal conductor facilitates a thermal transfer between the terminal and the temperature sensor; at least a portion of the electrical assembly is disposed in a conductive housing; the circuit board includes a void, and a portion of the housing extends into the void; and a portion of the thermal conductor is in contact with the portion of the housing that extends into the void.

16. An electrical assembly, comprising:
an electrical component including a terminal;
a power source electrically connected to the terminal;
an additional power source electrically connected to an additional terminal of the electrical component; and
a circuit electrically connected to a controller, the circuit including a temperature sensor disposed proximate the terminal;
wherein the circuit is configured to initiate a status change of said controller if a temperature of the terminal reaches a predetermined threshold;
wherein the electrical component includes a switch controllable by said controller;
wherein the power source is configured to supply power to one or more loads; and
wherein the additional power source is configured to supply power to the one or more loads when the switch is closed.

17. The electrical assembly of claim 16, wherein the temperature sensor is thermally connected to the terminal.

18. The electrical assembly of claim 17, wherein the electrical component and the temperature sensor are connected to a circuit board;
and the temperature sensor is not electrically connected to the electrical component.

19. The electrical assembly of claim 18, wherein at least a portion of the electrical assembly is disposed in a conductive housing.

20. A vehicle, comprising:
the electrical assembly of claim 16;
the controller; and
the one or more loads;
wherein the one or more loads include vehicle system components.

* * * * *